United States Patent [19]

Erickson

[11] Patent Number: 5,169,270
[45] Date of Patent: Dec. 8, 1992

[54] COMPRESSIBLE SCREW-TYPE LOCKING MECHANISM

[75] Inventor: Robert A. Erickson, Raleigh, N.C.

[73] Assignee: Kennametal Inc., Latrobe, Pa.

[21] Appl. No.: 712,136

[22] Filed: Jun. 3, 1991

[51] Int. Cl.5 .................... F16B 35/04; F16B 39/284; B23B 29/00
[52] U.S. Cl. .................... 411/306; 411/324; 411/419; 411/947; 29/456; 82/160
[58] Field of Search ............... 411/305, 306, 264, 271, 411/324, 419, 947; 81/124.2, 176.15, 176.1; 82/160; 29/456, 525.1

[56] References Cited

U.S. PATENT DOCUMENTS

| | | |
|---|---|---|
| 1,767,287 | 6/1930 | Hosking . |
| 1,874,389 | 8/1932 | Trotter .............................. 411/306 |
| 1,874,595 | 8/1932 | Olson . |
| 1,874,657 | 8/1932 | Trotter . |
| 2,202,928 | 6/1940 | Shaw .................... 411/305 |
| 2,601,651 | 6/1952 | Wandy . |
| 2,647,942 | 8/1953 | Borden et al. . |
| 2,941,563 | 6/1960 | Gouverneur II . |
| 2,991,695 | 2/1958 | Jones . |
| 3,777,356 | 12/1973 | Hemingway .................... 29/428 |
| 3,843,984 | 10/1974 | Bagheri et al. .................... 10/10 R |
| 4,708,040 | 11/1987 | Erickson .................... 82/36 B |
| 4,723,877 | 2/1988 | Erickson .................... 409/234 |
| 4,726,268 | 2/1988 | Erickson .................... 82/160 |
| 4,726,269 | 2/1988 | Erickson .................... 82/36 B |
| 4,736,659 | 4/1988 | Erickson .................... 82/160 |
| 4,747,735 | 5/1988 | Erickson et al. .................... 409/234 |
| 4,822,225 | 4/1989 | Haberle .................... 411/306 |
| 4,836,068 | 6/1989 | Erickson .................... 82/160 |
| 4,932,295 | 6/1990 | Erickson .................... 82/160 |
| 4,981,057 | 1/1991 | von Haas et al. . |

FOREIGN PATENT DOCUMENTS 0369211 5/1990 European Pat. Off. .

Primary Examiner—Neill R. Wilson
Attorney, Agent, or Firm—James G. Porcelli

[57] ABSTRACT

The present invention relates to a compressible screw-type locking mechanism including an oversized locking screw and a tool for compressing and rotatively driving the oversized locking screw through a threaded bore. Formed about the top of the locking screw is a head portion and extending downwardly from the head portion is a threaded shaft. At least one longitudinal slot extends through the head and at least partially through the shaft to form a locking screw with plural resilient segments. The locking screw assumes a normal expanded state with its threaded pitch diameter being oversized with respect to its companion bore. The locking screw is compressed by engaging the head thereof with the tool. In one embodiment, the compression of the locking screw is achieved through a torquing action. In a second embodiment, the compression is achieved by the axial movement of the tool. In either case by relieving the applied torque or removing the tool from the locking screw head results in the locking screw expanding within the bore and assuming an interference or locked fit within the bore.

17 Claims, 10 Drawing Sheets

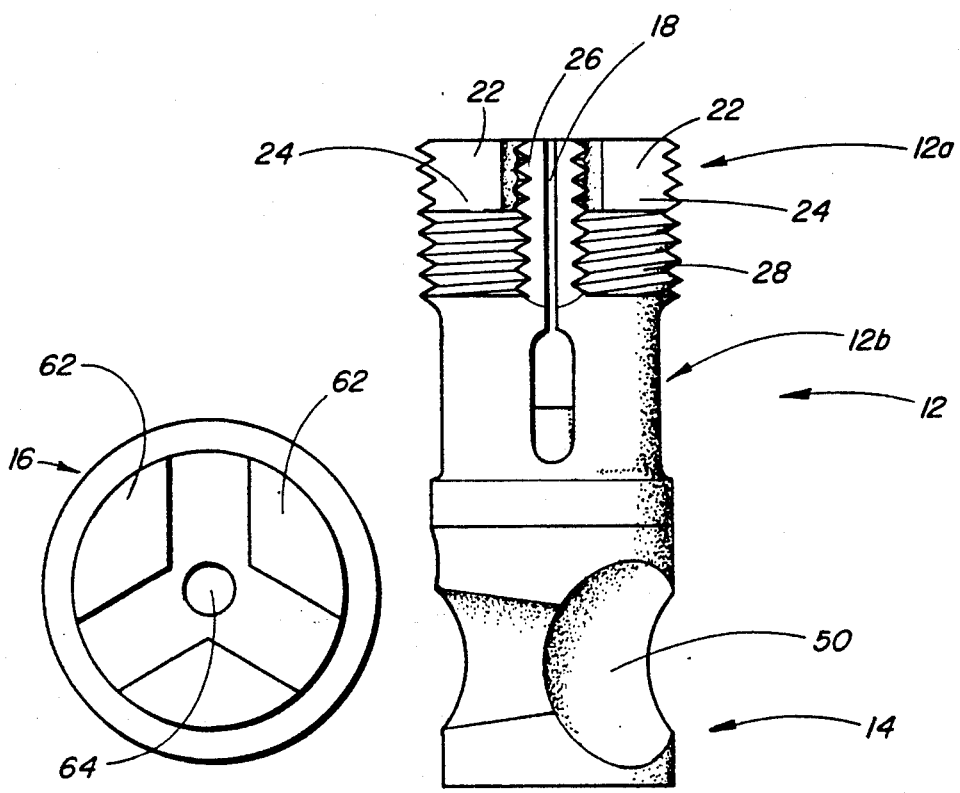
Fig. 2
Fig. 3
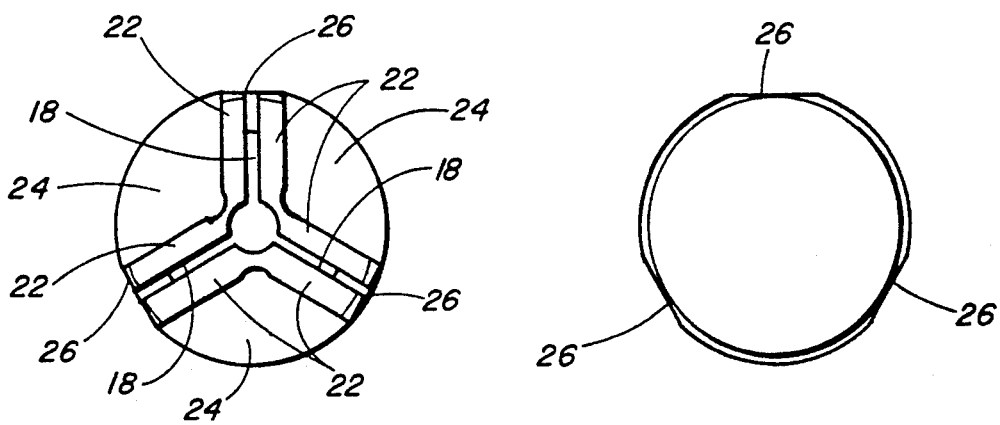
Fig. 4
Fig. 5

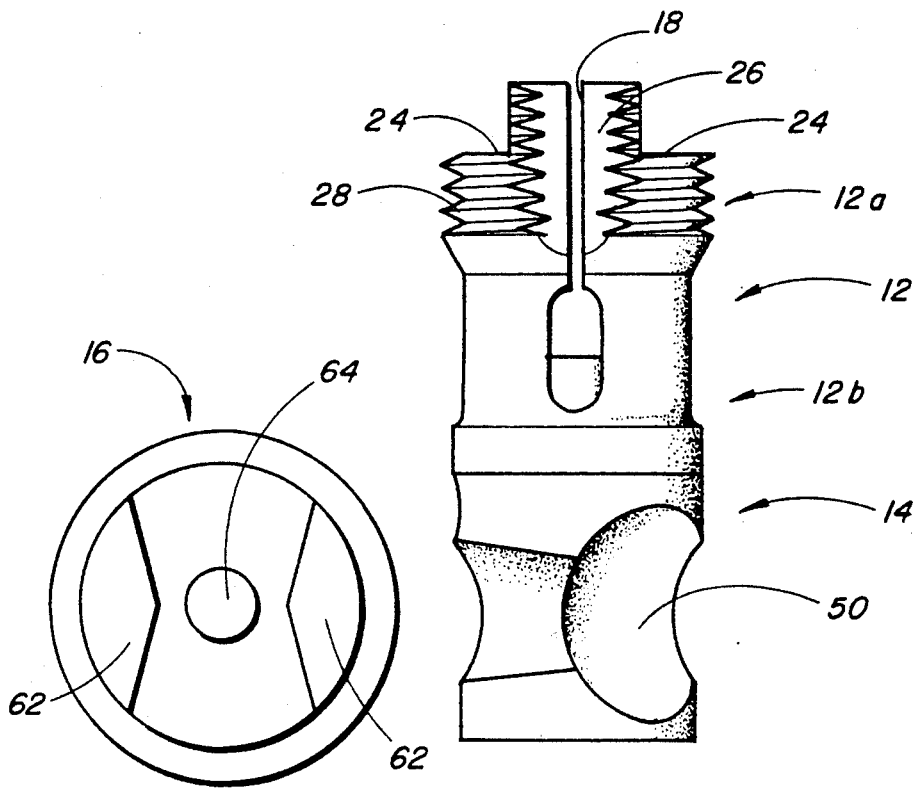
Fig. 7
Fig. 8
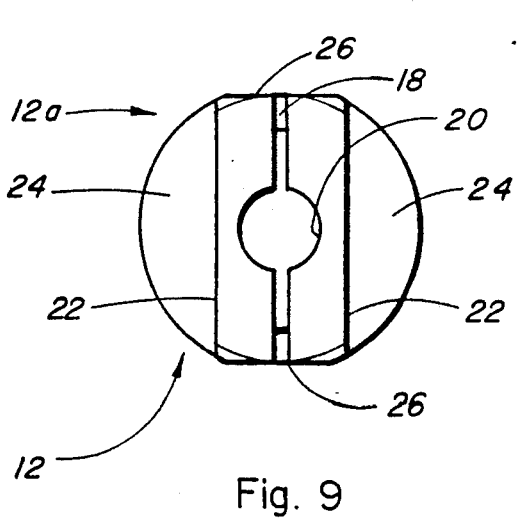
Fig. 9
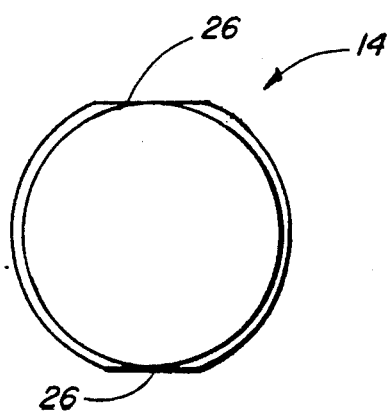
Fig. 10

COMPRESSIBLE SCREW-TYPE LOCKING MECHANISM

FIELD OF THE INVENTION

The present invention relates to locking devices, especially locking devices used in tools, and more particularly to compressible and expandable locking screws.

BACKGROUND OF THE INVENTION

Quick change tool holders are widely used in industry for various applications. One such quick change tool holder in wide use today is the KM series manufactured by Kennametal Inc. of Latrobe, Pa. For an appreciation of the KM tool holder one is referred to U.S. Pat. Nos. 4,836,068; 4,747,735; 4,736,659; 4,726,269; 4,723,877; and 4,708,040. The KM tool holder series utilizes a ball locking system to hold a tool holder in a tool block. In particular, the tool holder includes a shank having one or more apertures formed therein. A threaded locking rod extends through the central portion of the tool block and holder assembly. Formed on the locking rod is a ramp that is effective to engage one or more locking balls disposed between the locking rod and the aperture or apertures of the shank. To lock the tool holder within the tool block, the locking rod is turned such that the ramp engages the locking ball or balls and urges the same outwardly into locking engagement with the aperture or apertures formed in the shank. To unlock the tool holder from the tool block, the locking rod is rotated in the opposite direction allowing the balls to roll down the ramp and out of the locking position with the aperture of the tool holder shank. Hence, it is the axial movement of the lock rod and ramp structure that results in an inward disengagement or an outward engagement of the balls with the tool holder. This method requires several rotations of the lock rod to obtain the amount of axial movement necessary to fully engage or disengage the tool holder.

In order to facilitate quicker and more efficient engagement and disengagement of tool holders, Krupp Widia has developed a cam lock mechanism which is disclosed in European Patent Application No. 0369211. In this design a cam and screw assembly, which includes a threaded shaft and a cam lock surface located on the remote end of the threaded shaft, drives the balls into a locking position with the shank of the tool holder and maintains the lock. As the cam and screw assembly is rotated, it is not the axial movement of the mechanism that locks or disengages the balls, but instead the rotational movement of the cam structure. To lock the tool holder with the shank, the cam is rotated by a screw and in the process the cam surface engages one or more locking balls and drives them outwardly into locking engagement with the shank of the tool holder. In an unlocked or disengaged position, the balls rest in recessed portions of the cam structure. The angle of the cam maintains the ball or balls in an engaged or disengaged position as long as the cam remains in the selected position. This cam and screw assembly allows quicker and more efficient locking and release of the tool holder because only a turn of 180° or less is required to fully engage or disengage the balls.

While there are many advantages to the cam and screw assembly design of Krupp Widia, in some applications there is a tendency for the cam and screw assembly to self-release. Where a conventionally threaded screw is used, the cam and screw assembly is sometimes "backed off" due to high forces being transmitted back through the balls to the screw. The resulting rotation of the screw results in an altered cam position and thereby a complete or partial disengagement of the balls. Due to the physical constraints of typical tool holders like the KM series, it is not practically possible to modify the angle of the cam to avoid such self-release.

Therefore, there is a need for an efficient locking mechanism for holding the cam in a locked and stationary position even while substantial forces are being translated through the cam back to the locking mechanism tending to cause the locking mechanism to be at least partially disengaged.

SUMMARY AND OBJECTS OF THE INVENTION

The present invention meets the aforementioned needs and can be cost-effectively retrofitted to quick change tool holders such as the Kennametal KM series. The present invention is a compressible and expandable screw-type locking mechanism by which a locking ball cam may be locked in a selected position within a tool block without undesired back rotation even when substantial forces are being translated through the cam back to the locking mechanism which would tend to cause the screw-type locking mechanism to be backed off.

The locking mechanism of the present invention entails a radially compressible and expandable oversized locking screw and a tool for engaging and compressing the same. In one embodiment, the tool itself radially compresses the locking screw by applying torque to the head of that screw. As the locking screw is torqued and screwed into a bore, the oversized locking screw radially compresses such that it can be screwed into the bore relatively easy. By releasing the torque, the locking screw radially expands to where the threads of the locking screw form a tight interference locking fit within the bore. In use, the locking screw can be coupled to a cam member of the Krupp Widia type and utilized in a tool block and holder. It follows that the cam member can be securely locked by selectively locking the locking screw.

In a second embodiment of the present invention, the same type of locking screw is compressed by the axial movement of a compression tool which also serves to rotate the locking screw and to lock the same in the bore when the compression tool is removed.

It is therefore an object of the present invention to provide a compressible and expandable screw-type locking mechanism which may be retrofitted to existing tool holders.

Another object of the present invention is to provide a compressible and expandable screw-type locking mechanism for a tool holder wherein the locking screw is actually compressed by the torque of a separate tool while the screw is being turned by that tool.

It is also an object of the present invention to provide a compressible and expandable screw-type locking mechanism of the character described above wherein the design of the compressible screw permits easy and convenient insertion into its companion bore but which when released will expand and exert substantial force against the wall of the bore such that the screw in the expanded state will remain stationary and resist substantial back forces being transmitted.

Another object of the present invention is to provide a compressible screw-type locking mechanism for securing a tool holder within a tool block.

Another object of the present invention resides in the provision of a compressible screw-type locking mechanism for a tool holder and block assembly wherein a locking screw forming a part of the locking mechanism is compressed and turned by a compression tool.

Another object of the present invention is to provide a radially compressible locking screw that in an expanded state exerts substantial forces against the walls of a companion bore so as to form a secure and tight lock.

Another object of the present invention resides in the provision of a compressible locking screw of the character referred to above that is easy to use and which is reliable.

Other objects and advantages of the present invention will become apparent and obvious from a study of the following description and the accompanying drawings which are merely illustrative of such invention.

BRIEF DESCRIPTION OF THE DRAWINGS

FIG. 2 is a bottom plan view of the tool forming a part of the locking mechanism of FIG. 1.

FIG. 3 is a side elevational view of the locking screw and cam member forming a part of the locking mechanism of FIG. 1.

FIG. 4 is a top plan view of the locking screw forming a part of the locking mechanism of FIG. 1.

FIG. 5 is a bottom plan view of the cam member forming a part of the locking mechanism of FIG. 1.

FIG. 7 is a bottom plan view of the tool forming a part of the locking mechanism of FIG. 6.

FIG. 8 is a side elevational view of the locking screw and cam member forming a part of the locking mechanism of FIG. 6.

FIG. 9 is a top plan view of the locking screw forming a part of the locking mechanism of FIG. 6.

FIG. 10 is a bottom plan view of the cam member forming a part of the locking mechanism of FIG. 6.

DETAILED DESCRIPTION OF THE INVENTION

Figure 1:
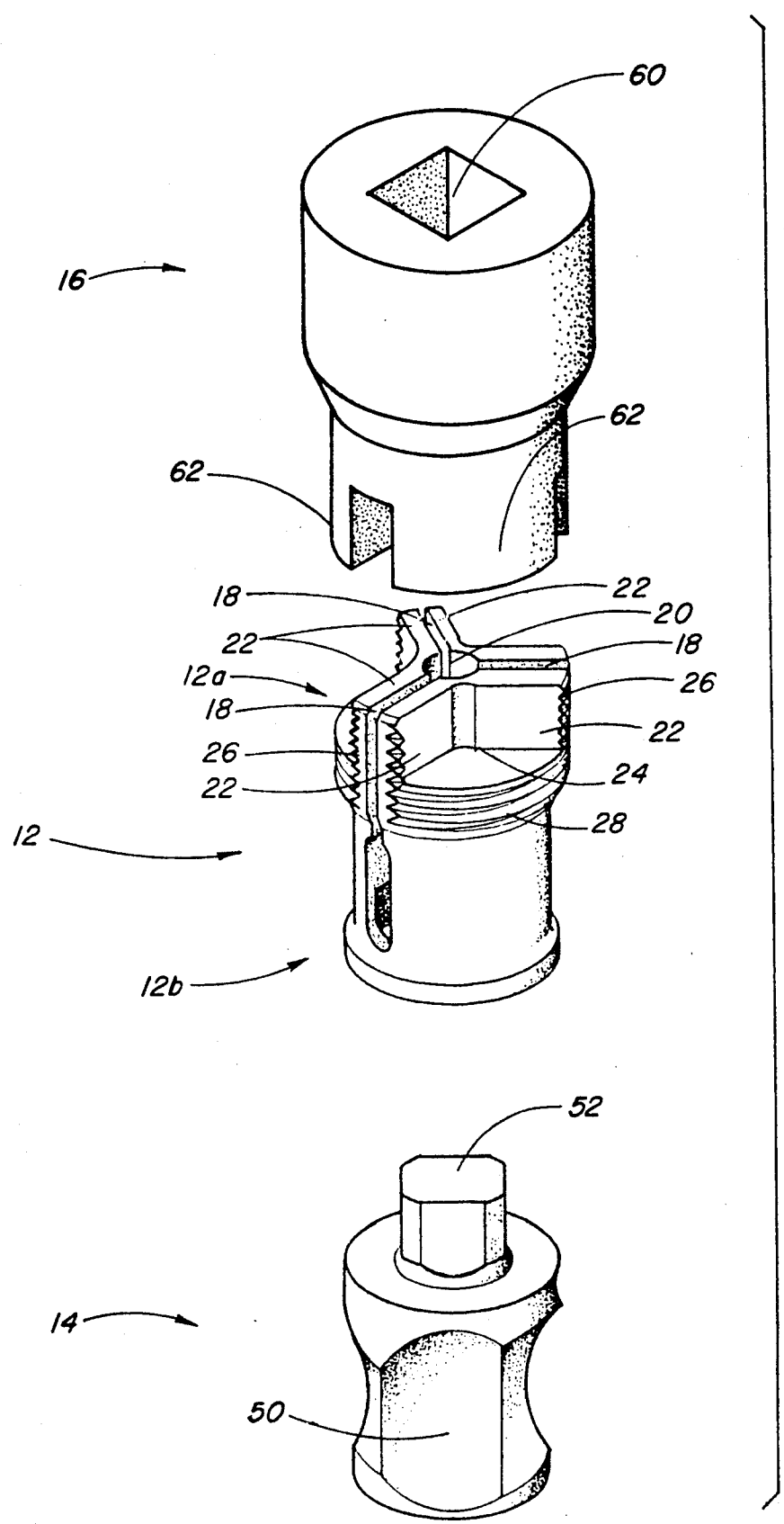
FIG. 1 is an expanded view of the screw-type locking mechanism of the present invention.
Figure 6:
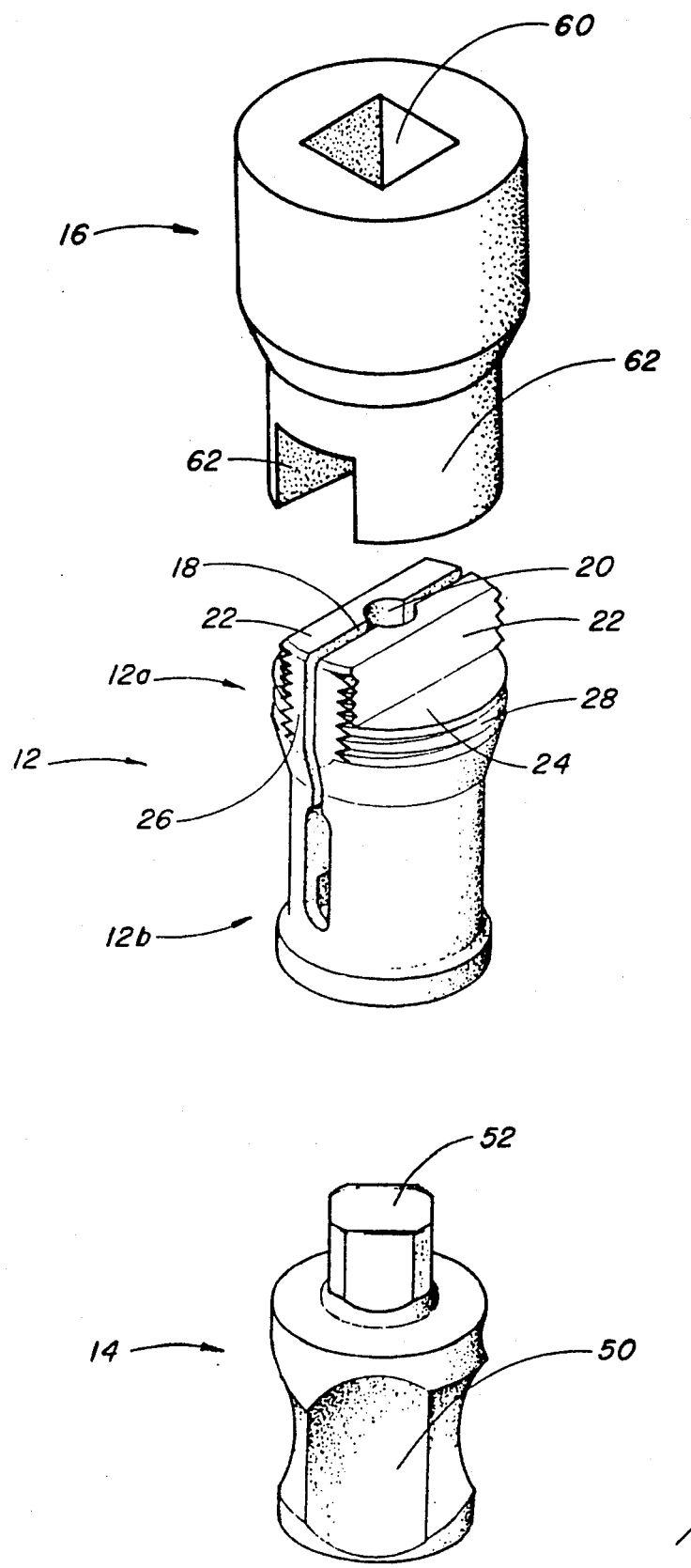
FIG. 6 is an expanded perspective view of an alternate design for the locking mechanism of the present invention.

With further reference to the drawings, the compressible screw-type locking mechanism of the present invention is shown therein and indicated generally by the numeral 10. As seen in FIGS. 1-5, locking mechanism 10 includes three basic components: a locking screw 12, cam member 14, and an actuating tool 16. As will be appreciated from subsequent portions of this disclosure, cam member 14 can be integrally formed with locking screw 12 or can be a separate component.

Turning to a discussion of the locking screw 12, it is seen that the same basically comprises a head 12a and a shaft 12b that extends downwardly from the head. Formed in the locking screw 12 is a series of longitudinally extending slots 18. As shown in FIG. 1, the locking screw 12 disclosed therein includes three separate longitudinal slots 18 that extend downwardly through the head 12a and shaft 12b of the locking screw 12. Effectively, the three slots 18 divide the locking screw into three resilient segments.

Formed in head 12a between the respective slots 18 and concentric with the locking screw 12 is a gauge bore 20 that is designed to mate with a portion of the tool 16, to be subsequently described. Extending radially adjacent each slot 18 is a wall 22. The respective walls 22 define three prong cavities 24 that are designed to mate with prongs that project from the lower portion of tool 16.

As particularly shown in FIGS. 1 and 4, locking screw 12 includes circumferentially spaced flats or flat areas 26 that are formed along the exterior side of each slot. The significance of flats 26 will be subsequently addressed. Formed about the shaft portion 12b of the locking screw 12 are threads 28 that are designed to be screwed into a threaded bore such as the threaded bore 70 of tool holder 76 (FIGS. 11-14). Locking screw 12 is oversized with respect to a selected standard bore size. In particular, the pitch diameter of the threads 28 is greater than would be conventional for the selected standard threaded bore 70 that is provided to receive the locking screw 12. It is contemplated that the excess pitch diameter would typically be in the range of 0.004-0.030 inch.

Cam member 14 includes a conventional cam surface 50 that is designed to engage and actuate one or more locking balls. In the context of a tool block and a tool holder, the cam surface 50 is disposed within the tool block such that the rotation of the same results in one or more locking balls being engaged by the cam surface 50 and urged into a locking arrangement with an aperture or apertures formed in a tool holder shank. Cam surface 50 and its application in a tool holder is not per se material to the present invention as the basic concept of a cam surface to actuate locking balls in a tool block-holder assembly is old and well-known in the art. See for example the Krupp Widia disclosure in European Patent Application No. 0369211. Continuing to refer to the cam member 14, it is seen that the same includes a turning head 52 that in the case of the design shown in FIG. 1 is designed to fit into a drive cavity (not shown) that is formed in the lower portion of shaft 12b of the locking screw 12. Thus, it is appreciated that once the drive head 52 has been inserted within the drive cavity of the locking screw shaft 12b, the cam surface 50 can be rotated between locked and unlocked positions by appropriately turning the locking screw 12.

Tool 16 is effective to both compress locking screw 12 and to screw the locking screw into an appropriate bore. As will be more fully appreciated from subsequent portions of this disclosure, tool 16 acts to radially compress the locking screw 12 by applying a torque to the head 12a of the locking screw 12. Once torque has been released or relieved from the head 12a, the locking screw 12 will radially expand, and in doing so, will self-lock within an appropriate bore.

Figure 11:
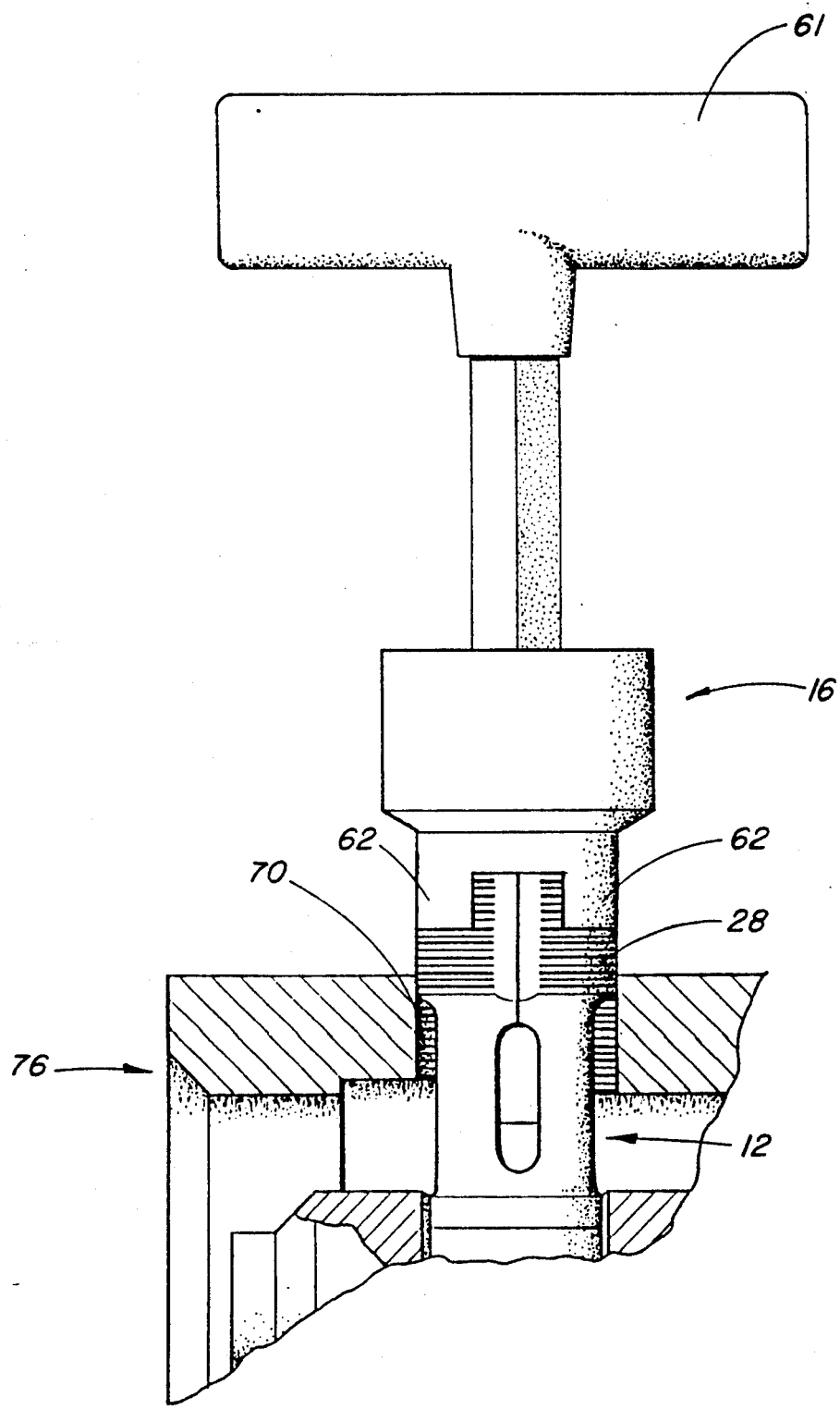
FIG. 11 is a fragmentary sectional view illustrating the locking screw of FIG. 1 in a compressed state and being screwed into the bore of a tool block.
Figure 12:
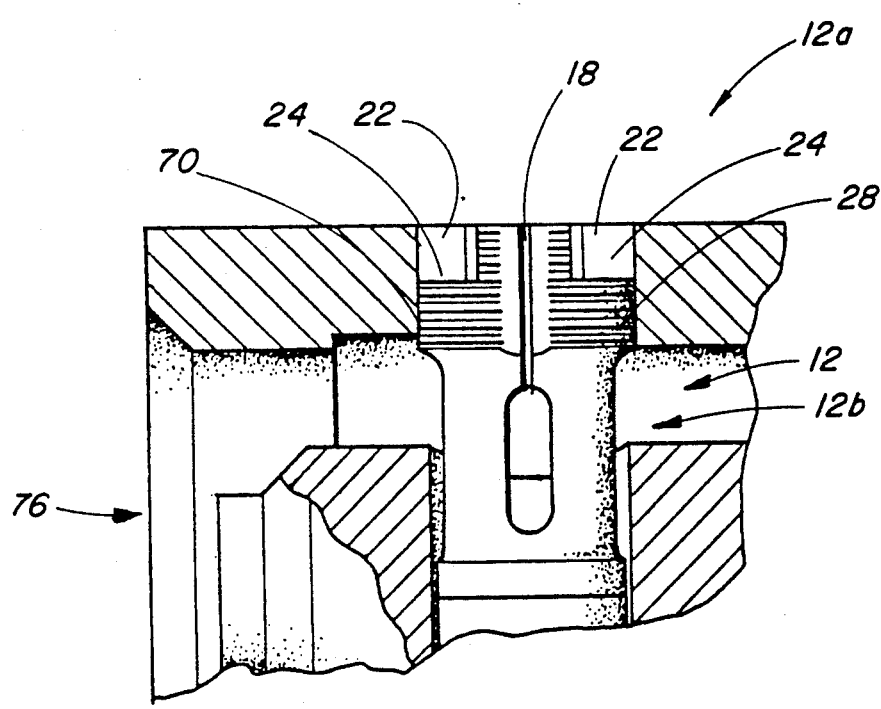
FIG. 12 is a fragmentary sectional view of a tool block showing the locking screw of FIG. 1 in an expanded locked position within the bore of the tool block.
Figure 13:
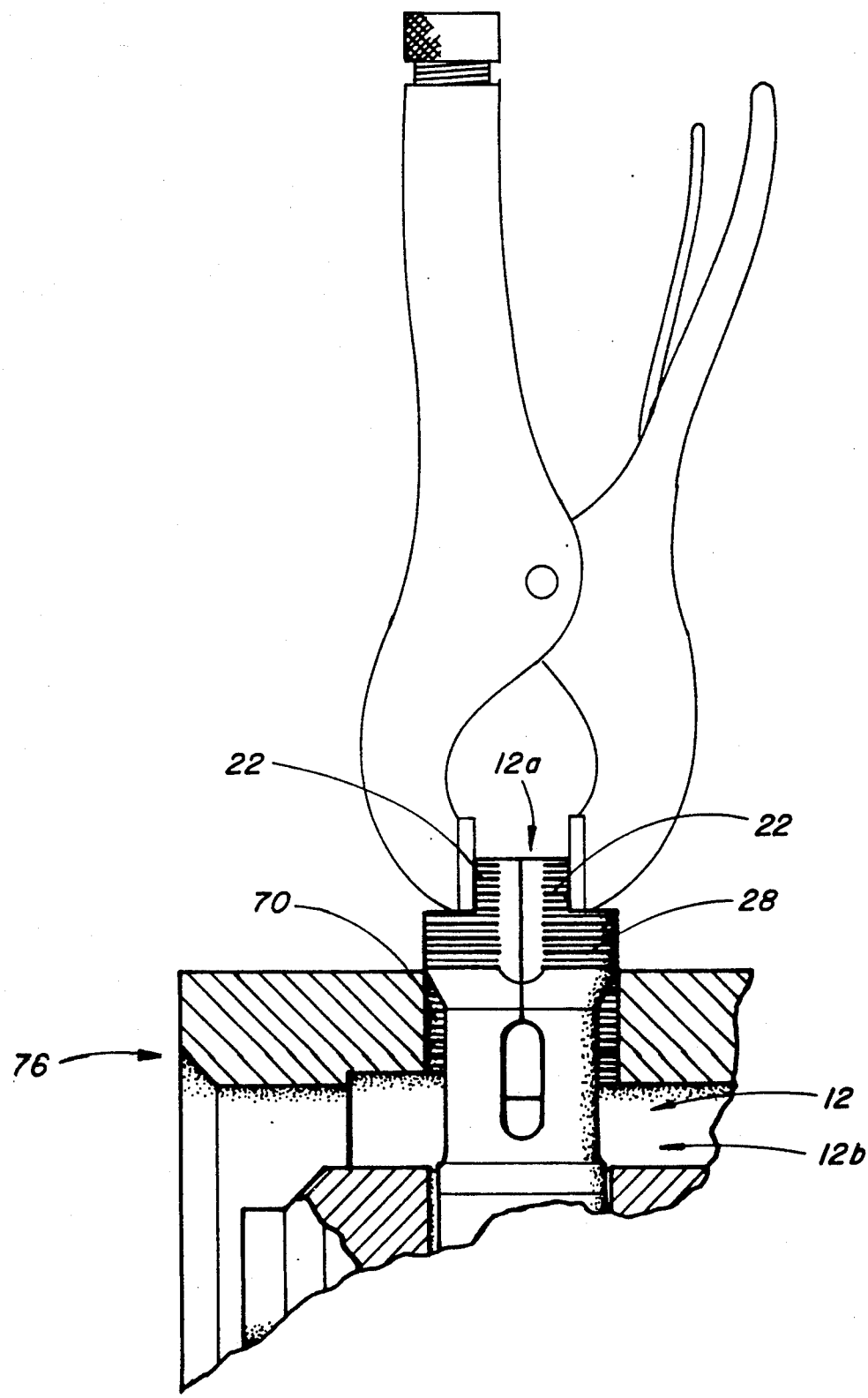
FIG. 13 is a fragmentary sectional view of a tool block showing the locking screw of FIG. 6 being compressed by locking pliers such that the same can be threaded into the bore of the tool block.

Viewing tool 16, it is seen that the same includes an upper ratchet cavity 60 that is designed to receive the remote end of a tool handle 61 (FIG. 11). Extending downwardly from the lower portion of the tool 16 is a series of turning prongs 62. Prongs 62 are designed to conform to the spacing and shape of the prong cavities 24 disposed about head 12a of the locking screw 12. Concentrically disposed between the prongs 62 is a gauge pin 64 that is designed to extend into the gauge bore 20 formed in head 12a. By particularly sizing pin 64 and gauge bore 20, one can limit the closure of slots 18 and can therefore limit the degree of radial compression of locking screw 12. Thus, it is appreciated that locking screw 12 can be rotated by simply inserting tool 16 downwardly onto head 12a and rotating tool 16 with a ratchet handle.

Turning to FIGS. 6-10, an alternate design for the screw-type locking mechanism 10 of the present invention is shown. The design depicted herein functions the same as the locking mechanism previously discussed, but differs slightly in structure. Instead of including three longitudinal slots, the embodiment shown in FIGS. 6-10 simply includes one elongated slot 18 that extends downwardly through head 12a and shaft 12b of the locking screw 12. This results in there simply being two prong cavities or areas 24 defined on opposite sides of the single elongated slot 18. Likewise, the tool 16 of the embodiment disclosed in FIGS. 6-10 has been designed to mate with the head 12a of the locking screw 12. Accordingly, tool 16 of this embodiment includes two turning prongs 62 that engage and bear against walls 22 formed on opposite sides of the elongated slot 18. As noted above, the locking mechanism 10 disclosed in FIGS. 6-10 functions the same as the locking mechanism disclosed in FIGS. 1-5. Basically, the tool 16 during the course of turning head 12a and applying a torque thereto radially compresses head 12a and causes the entire locking screw 12 to be radially compressed such that it can be screwed relatively easy into a certain bore. Once the torque is relieved from the head 12a, then it follows that head 12a and the entire locking screw 12 can expand to a locked position within the same bore.

Turning to FIGS. 11-14 there is shown therein a tool block and holder assembly that is indicated generally by the numeral 76. The compressible screw-type locking mechanism 10 just described is incorporated into the tool-block holder assembly 76. Details of the tool holder - block assembly are not dealt with herein in detail because such is not per se material to the present invention and because tool block and holder assemblies are well known and appreciated by those skilled in the art. However, as noted above, the compressible screw-type locking mechanism 10 is particularly suitable for use in the tool block and tool holder assembly 76 to maintain a secure and locked relationship between the tool block and its associated tool holder. Thus, a brief discussion will deal with the tool block and holder assembly 76. In this regard, tool block and holder assembly 76 includes a tool block 76a that includes a internal canister indicated by 76b in FIG. 14. A tool holder 76a is designed to be secured within the tool block 76a. Typically, tool holder 76d will include a shank portion 76c that is designed to be inserted within the tool block and particularly between the outer wall of the tool block 76a and the canister 76b. In conventional fashion, the canister will be provided with one or more locking balls that are designed to be engaged and moved into a locked relationship with one or more locking apertures formed in the shank 76c of the tool holder 76d. For a more complete and unified understanding of conventional tool block and holder assemblies, one is referred to the KM series manufactured by Kennametal Inc. (see Kennametal KM patents referred to under Background of the Invention) and the Krupp Widia Tool Block and Holder Assembly disclosed in European Patent Application No. 0369211.

Figure 14:
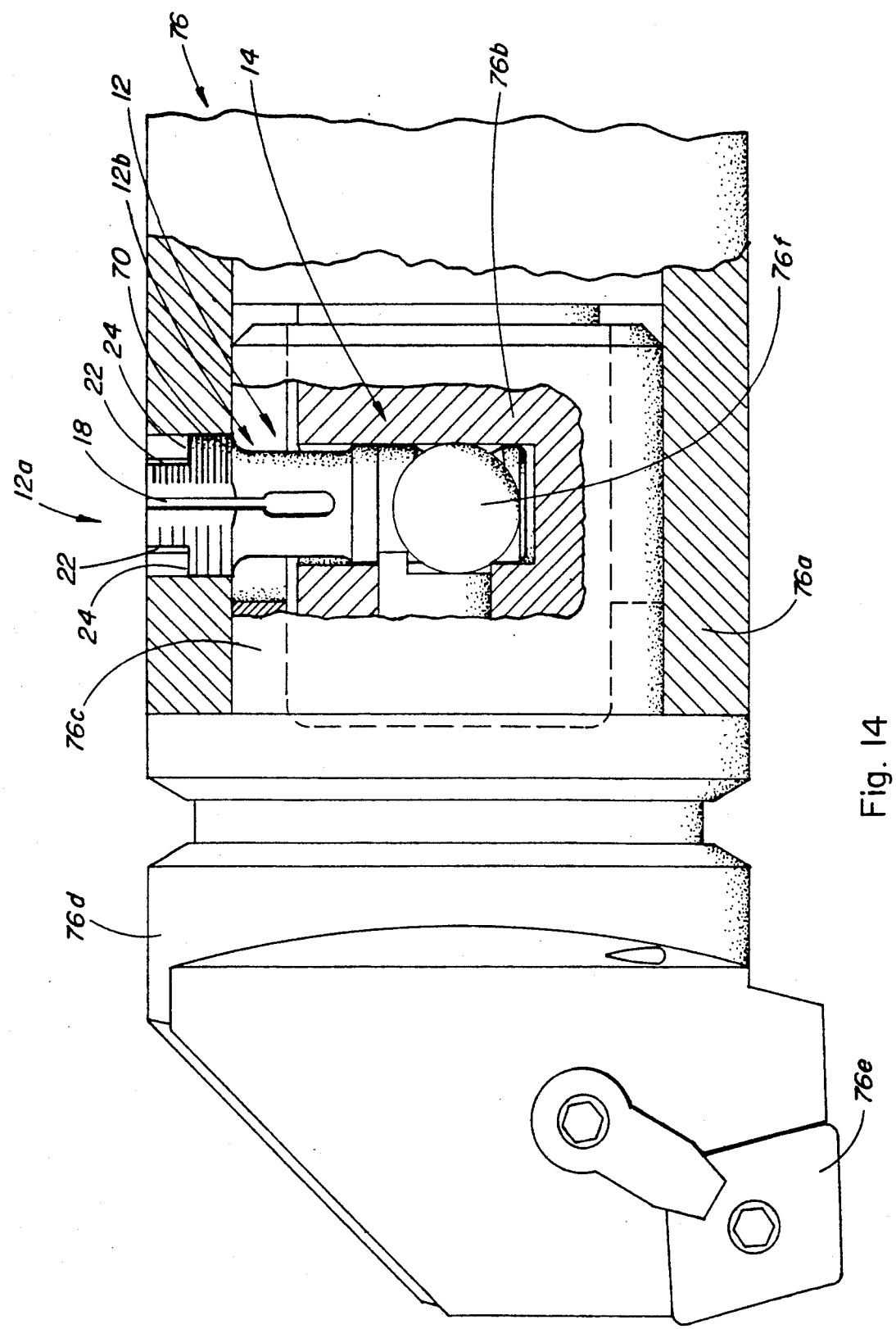
FIG. 14 is a fragmentary sectional view of a tool block and holder assembly showing the locking screw of FIG. 1 in an expanded locked position.

The screw-type compressible locking mechanism 10 of the present invention is particularly designed for use in tool block and holder assemblies. As illustrated in FIG. 14, tool block and holder assembly 76 is provided with a threaded bore 70 which is designed to receive the oversize locking screw 12 of the locking mechanism shown in FIGS. 1-10. As seen therein, the locking mechanism 10 of the present invention is designed to be screwed into bore 70 of the tool block and holder assembly 76 such that the cam member 14 is disposed within the canister area of the assembly. Essentially, cam member 14 is designed to assume a position adjacent one or more locking balls 76f in the same fashion as is found in the Krupp Widia disclosure in European Patent Application No. 0369211. In this position, the cam surface 50 is turned between locked and unlocked positions by the locking screw 12.

To insert screw 12 into the tool block-holder assembly 76, the screw 12 must first be compressed sufficiently to start the engagement of the threads 28 of the screw with the threads of the bore 70. In order to start the three segment design shown in FIGS. 1-5, the head 12a can be placed in a conventional drill chuck and compressed. While compressed, the screw 12 can be started within bore 70. Once the screw has been started, then the drill chuck can be released from the screw head 12a. To start the two segment locking screw shown in FIGS. 6-10, the head is gripped with a pair of locking pliers and the segments compressed together by the pliers. Thereafter, the normally oversized locking screw can be screwed within its companion bore. See FIG. 13. Once the locking screw has been started then the locking pliers can be removed and thereafter, the locking screw can be turned by its associated tool 16. In particular, as the tool 16 is turned by the tool handle 61 and torque is applied to head 12a, the slots 18 close or at least the slots 18 tend to become more narrow which effectively radially compresses the head 12a which in turn results in the total screw 12 being radially compressed sufficiently enough such that the total screw 12 can be screwed within the bore 70. It is appreciated that the compression is directly caused by the torquing action of the tool 16. Once this torque is released from the head 12a, then it follows that the head 12a expands and so does the shaft 12b of the screw. This expansion results in the threads 28 pushing outwardly against the wall of the bore 70 at a substantial force so as to create a locking relationship. Depending on the size of the locking screw 12, one can anticipate locking forces on the order of 200-400 pounds. Effectively, sufficient force can be generated by the expanded screw 12 to yield 3-20 ft.-lbs resistance. That is sufficient to hold the cam stationary in most applications and will prevent the locking screw from being "backed-off."

Figure 15:
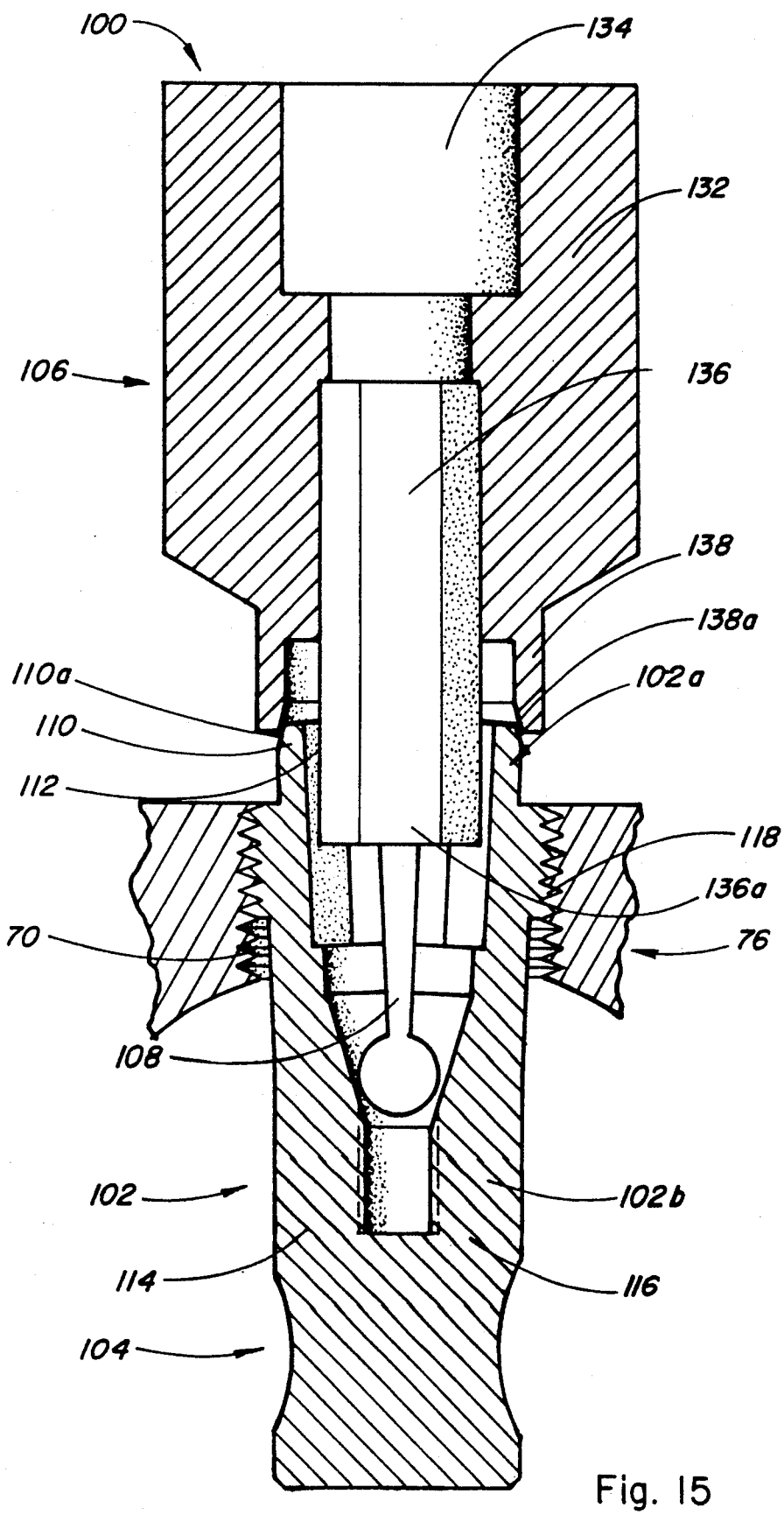
FIG. 15 is a sectional view of another embodiment of the locking mechanism of the present invention with the locking screw being shown in an expanded locked position.
Figure 16:
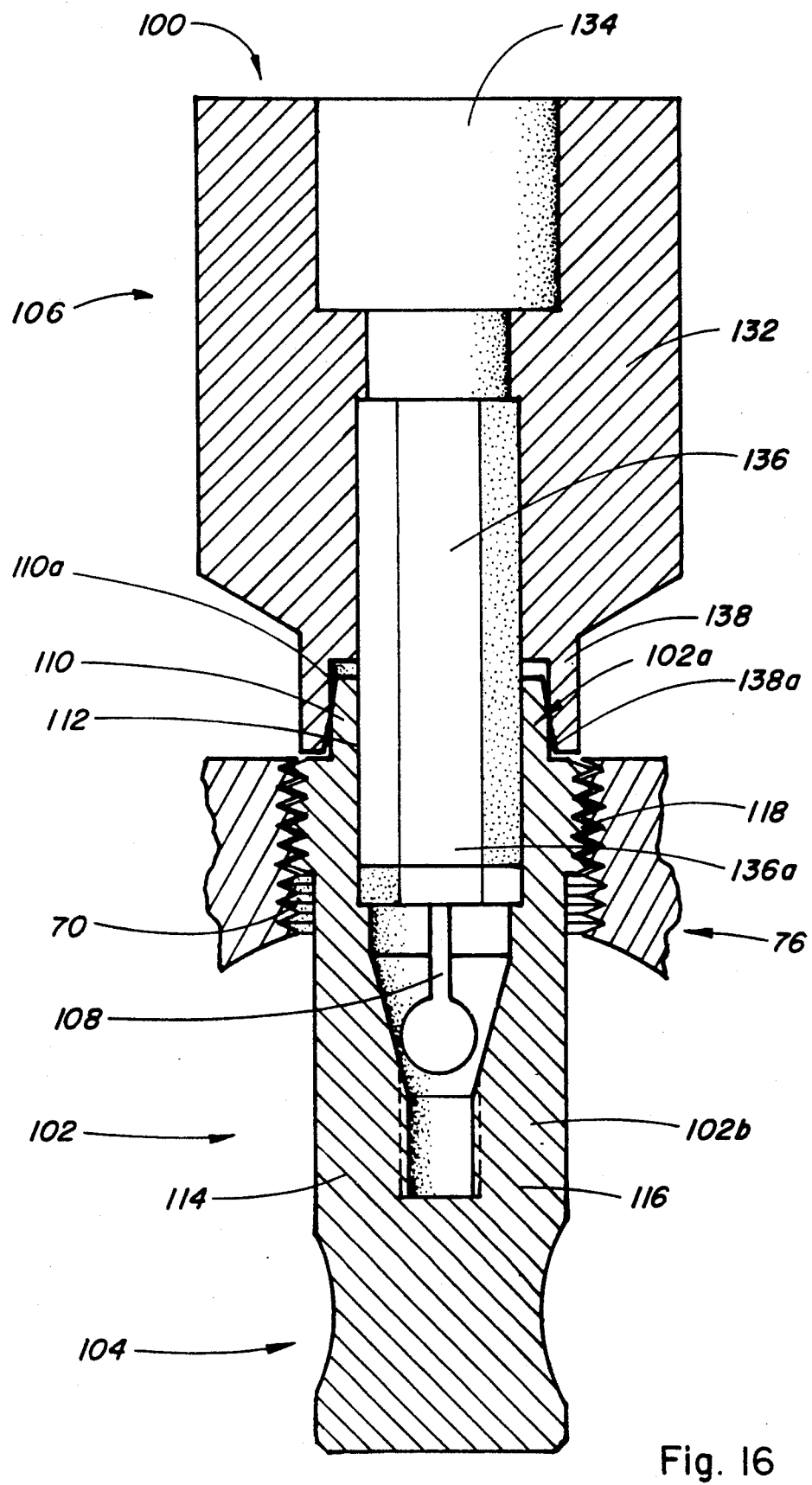
FIG. 16 is a cross-sectional view of the locking mechanism shown in FIG. 15 with the locking screw being disposed in a compressed state.

In FIGS. 15 and 16, another embodiment of the compression screw-type locking mechanism of the present invention is shown therein. This embodiment illustrates an axially actuated screw-type locking mechanism and is indicated generally by the numeral 100 in the drawings. Locking mechanism 100 also includes a locking screw (similar to that previously discussed) indicated generally by 102, a cam member indicated generally by 104, and a tool indicated generally by 106.

With reference to the locking screw 102, it is seen that the same includes a head 102a and a shaft 102b. It is also appreciated that locking screw 102 includes a longitudinal extending slot 108 that extends downwardly completely through head 102a and downwardly a selected distance through shaft 102b. This effectively divides the locking screw 102 into two flexible and resilient segments 114 and 116. About head 102a of the locking screw there is formed a circular head collar 110. Head collar 110 includes an outer circular wall that has an inwardly directed taper 110a. Also formed in head 102a is a hex cavity 112 that is designed to receive a hex shaped driver.

Disposed below head 102a is a set of external threads 118 that extend around a portion of the locking screw shaft 102b. As discussed previously, the locking screw 102 is designed to be screwed into bore 70 that forms a part of the tool block 76.

Integrally formed or coupled to the locking screw 102 is a cam member 104. Cam member 104 includes a cam surface 130. Cam member 104 is of the same design as the cam member 14 that forms a part of the locking mechanisms shown in FIGS. 1 and 6.

Adapted to be coupled to the locking screw 102 is a compression tool 106. Functionally, compression tool 106 acts to compress as well as turn the locking screw. Structurally, compression tool 106 includes a main body 132 having a drive cavity 134. Extending from the drive cavity 134 is a hex drive 136 that includes a driver extension 136a that is designed to extend into the hex cavity 112 formed in the locking screw 102.

Formed about the end of the compression tool 106 opposite the drive cavity 134 is a circular compression collar 138. Compression collar 138 includes an inner wall that includes an outward taper 138a. Compression collar 138 and head collar 110 are sized such that head collar 110 will just fit inside of compression collar 138. The respective tapers of collars 110 and 138 enable the compression tool 106 to be driven downwardly on head collar 110 so as to compress the same and in the process compress the entire locking screw 102 including segments 114 and 116. This compression step is illustrated in FIGS. 15 and 16. Once tool 106 assumes the position shown in FIG. 16, it follows that locking screw 102 can be turned with there being virtually no interference between the threads 118 of the locking screw and the threads of bore 70. Once the locking screw has been appropriately screwed into bore 70, a locked state is achieved by simply pulling compression tool 106 from head collar 110 which causes the locking screw to assume an expanded state. In the expanded state, because locking screw 102 is oversized, there is interference between the threads 118 of the locking screw 102 and the threads of bore 70. Effectively, the expansion of the locking screw forms a radial holding force that is directed against the interior wall of bore 70 and it is this locking force that secures the locking screw 102 within bore 70.

It is appreciated that as the head of the locking screw is turned and the locking screw screws into the bore 70, that outer circumferential portions of the locking screw in the area of the slots 18 tend to extend outwardly from a normal circular configuration and create undesirable interference with the threaded bore 70. Because this situation is prominent around the slot areas 18, the locking mechanism of the present invention is provided with the flats or flat areas 26. Essentially, these areas are originally formed with threads but are "shaved" down to give rise to the flats 26. This provides clearance in the area adjacent the slots 18 and avoids undesirable interference which could result from the torquing of the segmented locking screw.

To manufacture screw 102 disclosed therein, it is contemplated that the locking screw will be completely milled, threaded and otherwise prepared from standard stock. To deform and expand the locking screw 102 to a selected degree, there are numerous suitable approaches. For example, the screw can be selectively impacted which will cause the various segments 114 and 116 of the screw to taper outwardly. Once there is sufficient taper to create an oversized relationship with respect to the intended bore, then the locking screw is heat treated such that it will naturally assume this deformed, expanded state. In other cases, such as with the locking screw 12 shown in FIGS. 1-10, the locking screw can simply be machined from oversized stock. No impact deformation would be required in this case.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A compression and expansion screw-type locking mechanism adapted to be screwed into a threaded bore by torque means comprising:
 (a) a shaft having upper and lower end portions and an external thread formed around a portion of the shaft;
 (b) a longitudinally extending slot formed in the threaded shaft and defining at least two resilient segments that are radially compressible and expandable;
 (c) means formed about the upper end portion of the shaft for receiving and connecting to the torque means such that the screw may be screwed into the bore by the action of the torque means; and
 (d) wherein the resilient segments are radially compressible by the torque means in response to torque being applied to the upper portion of the threaded shaft thereby enabling the threaded shaft to be screwed into the bore, wherein the resilient segments radially expand in response to the torque being relieved from the upper portion of the threaded shaft such that the resilient segments move radially outwardly to engage the lock against the bore and wherein the threaded shaft further includes a cam structure formed about the lower end portion for engaging at least one locking ball.

2. The locking mechanism according to claim 1 wherein the diameter of the threaded shaft in the free-standing expanded state is larger than the diameter of the threaded bore such that when the threaded shaft is compressed, screwed into the bore and expanded, the threads of the resilient segments project outwardly and engage and lock against the bore.

3. The locking mechanism according to claim 1 wherein the locking mechanism includes a head having a series of prong cavities formed thereon and adapted to receive a series of prongs extending from the torque means.

4. The locking mechanism according to claim 1 wherein the threaded shaft further includes three longitudinal radial slots uniformally spaced about the axis of the shaft and a series of cavities formed between the slots in the upper portion of the shaft.

5. The locking mechanism according to claim 1 including at least one generally flat exterior surface bridging a slot so as to avoid pitch interference with the threads of the bore when the resilient segments tend to be twisted and deflected by the application of torque.

6. The locking mechanism according to claim wherein the threaded shaft is of a coupled two-piece construction, the first piece being compressible and expandable and including the upper end portion and the second piece including a ball locking cam structure that is driven by the first piece.

7. The compression screw-type locking mechanism of claim 1 wherein the locking mechanism forms a part of a tool block and holder assembly comprising a tool holder with a shank that projects into a tool block, and wherein the threaded bore is formed in the tool block and the locking screw is normally held within the bore and connected to a cam locking member that is moveable between locked and unlocked positions for securing the shank of the tool holder within the tool block.

8. A tool block and holder assembly having a compression and expansion screw-type locking mechanism incorporated therein for securing a tool holder within a tool block comprising:
 (a) a tool block having a threaded bore formed therein;
 (b) a tool holder having a shank adapted to extend into the tool block and to be secured therein;
 (c) a compression and expansion screw-type locking mechanism disposed within the tool block and including:
  (1) a locking screw having a head and a threaded shaft secured within the threaded bore of the tool block, the locking screw being oversized with respect to the threaded bore formed in the tool block;
  (2) a longitudinally extending slot formed in both the head and threaded shaft of the locking screw for defining at least two resilient segments that are radially compressible and expandable;
  (3) a cam member and locking element means disposed within the tool block for locking the shank of the tool holder within the tool block, the cam member being operatively connected and driven by the locking screw and driven between locked and unlocked positions, and wherein the locking element means is engageable with the cam member as the same is moved between the locked and unlocked positions such that the locking element means is moved into and out of locking engagement with the shank of the tool holder;
 (d) a locking screw tool forming a part of the locking mechanism and operative to engage the head of the locking screw for turning the same;
 (e) wherein the resilient segments of the locking screw are radially compressible by the torque applied to the head of the locking screw by the compression tool as the locking screw is turned thereby enabling the locking screw to be screwed into the bore of the tool holder relatively easy while the locking screw assumes a compressed state; and
 (f) wherein the resilient segments radially expand in response to torque being released from the head of the locking screw thereby causing the resilient segments to move radially outwardly to engage and lock against the bore of the tool block.

9. A compression and expansion screw-type locking mechanism adapted to be screwed into a threaded bore comprising:
 (a) a locking screw having a threaded shaft and a head with an outer wall;
 (b) a longitudinal extending slot formed in both the head and the threaded shaft and defining at least two resilient segments that are radially compressible and expandable;
 (c) a locking screw tool forming a part of the locking mechanism and operative to engage the head of the locking screw for compressing the same;
 (d) the compressing and expanding tool including a compression collar for engaging the outer wall of the head of the locking screw and radially compressing the head which in turn radially compresses the threaded shaft causing the threaded shaft to be transformed from an expanded state to a compressed state;
 (e) wherein the tool is axially moveable along the outer wall of the head of the locking screw and wherein the tool's compression collar is operative to compress the head of the locking screw in response to the tool being axially moved on the outer wall of the head; and
 (f) wherein removal of the compression collar results in the head and consequently the shaft returning to an expanded state.

10. The compression and expansion screw-type locking mechanism of claim 9 wherein the compression collar of the tool also functions to apply turning torque to the head of the locking screw for screwing the same within the threaded bore.

11. The compression and expansion screw-type locking mechanism of claim 9 wherein the compression collar includes an inner wall and wherein the outer wall on the head and the inner wall are tapered to facilitate the insertion of the compression collar onto the head.

12. The compression and expansion screw-type locking mechanism of claim 9 wherein the locking mechanism includes a rotating cam that is coupled to and driven by the locking screw.

13. A method of compressing and screwing a normally expanded oversized locking screw having a head with an outer wall into a bore, comprising the steps of:
 (a) surrounding a portion of the head of the locking screw with a compression tool and engaging the head locking screw with the compression tool;
 (b) moving the compression tool axially along the head of the locking screw and compressing the head and the locking screw as the tool moves axially along the head so as to transform the locking screw from normal expanded state to a compressed state;

(c) screwing the locking screw within the bore while in the compressed state; and (d) removing the torquing device from the head of the locking screw and allowing the locking screw to expand from the compressed state to the expanded state where the expanded locking screw forms an interference, locked fit within the bore.

14. A method of compressing, screwing, and locking an oversized slotted locking screw having a head into a bore, comprising the steps of:

(a) compressing the locking screw head to start the threads of the locking screw into the bore;

(b) engaging the head of the locking screw with a torquing device;

(c) applying a torquing action to the head of the locking screw;

(d) compressing the locking screw by the torquing action of the torquing device and screwing the locking screw within the bore while in a compressed state; and (e) releasing the torquing action from the head of the locking screw and allowing the locking screw to expand from the compressed state to an expanded state where the expanded locking screw forms an interference, locked fit within the bore.

15. The method of claim 14 wherein the compressing step includes twisting and deforming the head of the locking screw through the torquing action resulting in the locking screw being compressed.

16. The method of claim 14 including slotting the locking screw by extending a longitudinal slot completely through the head and at least partially through a threaded shaft portion extending from the head so as to divide the locking screw into at least two resilient segments.

17. The method of claim 14 including the step of locking a tool holder within a tool block by screwing the locking screw into a threaded bore formed in the tool block and connecting a cam member disposed within the tool block with the locking screw and driving the cam member between locked and unlocked positions by turning the locking screw, wherein the cam member is operative to drive locking ball means between locked and unlocked positions with respect to the shank of the tool holder.

* * * * *